US011537845B2

(12) United States Patent
Sevrens et al.

(10) Patent No.: US 11,537,845 B2
(45) Date of Patent: Dec. 27, 2022

(54) NEURAL NETWORKS FOR INFORMATION EXTRACTION FROM TRANSACTION DATA

(71) Applicant: Yodlee, Inc., Redwood City, CA (US)

(72) Inventors: Matthew Sevrens, Campbell, CA (US); Zixuan Pan, Santa Clara, CA (US)

(73) Assignee: Yodlee, Inc., San Mateo, CA (US)

(*) Notice: Subject to any disclaimer, the term of this patent is extended or adjusted under 35 U.S.C. 154(b) by 809 days.

(21) Appl. No.: 15/486,230

(22) Filed: Apr. 12, 2017

(65) Prior Publication Data
US 2018/0300608 A1    Oct. 18, 2018

(51) Int. Cl.
| | |
|---|---|
| G06N 3/04 | (2006.01) |
| G06F 16/25 | (2019.01) |
| G06F 16/28 | (2019.01) |
| G06N 3/08 | (2006.01) |

(52) U.S. Cl.
CPC ......... *G06N 3/0445* (2013.01); *G06F 16/254* (2019.01); *G06F 16/285* (2019.01); *G06N 3/0454* (2013.01); *G06N 3/082* (2013.01); *G06N 3/084* (2013.01)

(58) Field of Classification Search
CPC ............ G06N 20/00; G06N 3/08; G06N 5/04; G06N 7/02; G06N 3/0454; G06N 3/04; G06N 3/0445; G06N 5/02; G06N 5/046; G06N 7/005; G06N 3/084; G06N 5/003; G06N 20/10; G06N 20/20; G06N 3/088; G06N 3/02; G06N 3/0427; G06N 3/063; G06N 5/022; G06N 3/0472; G06N 3/0481; G06N 3/082; G06N 3/006; G06N 3/049;

(Continued)

(56) References Cited

U.S. PATENT DOCUMENTS

| | | | |
|---|---|---|---|
| 2005/0043961 A1 | 2/2005 | Torres et al. | |
| 2008/0154704 A1* | 6/2008 | Flake ................. | G06Q 30/0242 705/14.41 |
| 2018/0032844 A1* | 2/2018 | Yao .................... | G06K 9/00362 |

FOREIGN PATENT DOCUMENTS

WO    WO2017057921 A1    4/2017

OTHER PUBLICATIONS

Yadollah Yaghoobzadeh et al., Multi-level Representations for Fine-Grained Typing of Knowledge Base Entities, Jan. 16, 2017 (Year: 2017).*

(Continued)

*Primary Examiner* — Ann J Lo
*Assistant Examiner* — Charles C Kuo
(74) *Attorney, Agent, or Firm* — Fish & Richardson P.C.

(57) ABSTRACT

Methods, systems and computer program products implementing character-level deep neural networks for information extraction are disclosed. A system uses character-level information retrieved from a transaction record to classify the transaction as a whole and to tag individual sections of the transaction record by entity type. The system processes the transaction record using multiple and separate character-level models. The system can use a one-dimensional neural network for featurization fed into a fully connected network for classification for identifying the most common classes of a transaction record. The system can identify one or more entities, e.g., service provider names, from the transaction using an RNN. The RNN can include one or more LSTM models. The LSTM models can be BI-LSTM models.

20 Claims, 4 Drawing Sheets

(58) Field of Classification Search
CPC ........ G06N 3/061; G06N 3/086; G06N 3/126; G06N 5/00; G06N 5/043; G06N 5/045
See application file for complete search history.

(56) References Cited

OTHER PUBLICATIONS

Xuezhe Ma et al., End-to-End Sequence Labeling via Bi-Directional LSTM-CNNs-CRF, Mar. 4, 2016 (Year: 2016).*

Dredze, Mark et al., Entity Disambiguation for Knowledge Base Population, Aug. 2010, Proceedings of the 23rd International Conference on Computational Linguistics (Coling 2010), pp. 277-285 (Year: 2010).*

PCT International Preliminary Report on Patentability in International Appln. No. PCT/US2018/026958, dated Oct. 24, 2019, 7 pages.

Lai et al., "Recurrent Convolutional Neural networks for Text Classification", Proceedings of the 29th AAAI Conference on Artificial Intelligence, Jan. 25-29, 2015, pp. 2267-2273.

Wang et al., "Combination of Convolutional and Recurrent Neural Network for Sentiment Analysis of Short Texts", Proceedings of COLING 2016, 26th International Conference on Computational Linguistics: Technical Papers, Dec. 11-17, 2016, pp. 2428-2437.

Zhou et al., "A C-LSTM Neural Network for Text Classification", Cornell University Library: Computer Science, computation and language, submitted Nov. 30, 2015, pp. 1-10.

International Application No. PCT/US2018/026958, Notification of Transmittal of the International Search Report and the Written Opinion of the International Searching Authority, dated Jul. 26, 2018, 10 pages.

Chiu et al., "Named Entity Recognition with Bidirectional LSTM-CNNs" Transactions of the Association for Computational Linguistics, 4:357-70, Dec. 2016.

EP Search Report in European Application No. 18785007.8, dated Mar. 27, 2020, 11 pages.

* cited by examiner

NEURAL NETWORKS FOR INFORMATION EXTRACTION FROM TRANSACTION DATA

TECHNICAL FIELD

This disclosure relates generally to transaction data processing.

BACKGROUND

Transaction data can include data describing transactions between service providers and customers. The service providers can include, for example, Web sites, hospitals, merchants, or financial institutes. The customers can include, respectively for example, client computers, patients, shoppers, or bank customers. A data mining server can gather the transaction data and enrich the transaction data for data analyzers, e.g., research institutes for studying content download patterns, health trends, shopping trends, and bank service demand. Enriching the transaction data can include, for example, labeling, tabulating or spell-checking the transaction data.

The data mining server may gather the transaction data from various sources. Transaction data from different sources may have different formats, due to different system that transaction data flow through before reaching the data mining server. Names may be concatenated. Some characters may be omitted. For example, the term "ABC market" can appear as "ABCmkt" in the transaction data. In addition, the transaction data can be different from natural language. Accordingly, conventional text mining and natural language featurization techniques such as term frequency—inverse document frequency (tf-idf) or word2vec models may not provide sufficiently useful results.

SUMMARY

Techniques of using character-level deep neural networks for information extraction are disclosed. A system uses character-level information retrieved from a transaction record to classify the transaction as a whole and to tag individual sections of the transaction record by entity type. The system processes the transaction record using multiple and separate character-level models. The system can use a one-dimensional convolutional neural network (CNN) for featurization which then can be fed to a fully connected network for identifying the most common classes of a transaction record. The system can identify one or more entities, e.g., service provider names, from the transaction record using a recurrent neural network (RNN). The RNN can include one or more long short-term memory (LSTM) models. The LSTM models can include bidirectional LSTM (BI-LSTM) models.

The features described in this specification can be implemented to achieve one or more advantages over conventional data enrichment techniques. For example, the disclosed techniques can be a more effective way of data enrichment, which enhances usefulness of raw transaction data. In particular, for example, the disclosed techniques improve upon conventional data enrichment techniques, e.g., categorization, by improving accuracy. The disclosed techniques can be used to categorize service providers, e.g., government organizations, educational institutes, health care providers, or merchants.

The disclosed techniques improve upon conventional service provider categorization techniques, e.g., unsupervised canopy clustering, by increasing accuracy and reducing complicated and costly processes of data collection and maintenance of multiple classifiers. The disclosed techniques use only a small number of models, and is easy to train. The disclosed techniques can be applied to a large number of classification tasks without the need of manual tuning. Accordingly, the disclosed techniques are advantageous over conventional approaches by allowing creation of region-specific classifiers and other categories such as transaction type, e.g., transfers, refunds, deposits, among others, that a data analyst may wish to investigate.

The disclosed techniques can handle both large service providers, e.g., top X merchants that serve a certain percentage (e.g., 50 percent) of all transactions, and small service providers, e.g., non-franchised businesses. The disclosed techniques offer an all-in-one character-level named entity recognition (NER) tagger for transaction data. The tagger can label various entities in the transaction record by entity type. The tagger can achieve higher accuracy compared to conventional ruled-based or search-based approaches.

The dual-model approach for classifying a service provider as disclosed in this specification provides both high coverage and highly tuned accuracy for common service providers. The disclosed dual-model approach can also be easily applied to any NER or classification task involving transactions without manual tuning. The disclosed techniques are highly advantageous over conventional data enrichment techniques because the disclosed techniques allow easy addition of new service providers. As distribution of revenue towards individual service providers can be highly variable overtime. Accordingly, new service providers need to constantly be added to the training data. The disclosed techniques are well suited to handle such additions.

The disclosed techniques can classify and tag sections of transaction records that conventional token-based models cannot easily achieve. In this regard, conventional token-based approaches are generally inferior to the NER provided by the RNN and the classification provided by the CNN as disclosed in this specification.

A practical advantage of the disclosed techniques over conventional techniques is that application of the disclosed techniques does not require high-skilled and expensive workers to train the models. In addition, the models are generalizable to any problem set involving transaction data. As the CNN and RNN are highly adaptable, only low skilled workers are needed to label training data. Engineers who can manually tune individual classifiers for different problem sets are not required. Therefore, the disclosed techniques can enrich transaction data in an inexpensive way.

The details of one or more implementations of the disclosed subject matter are set forth in the accompanying drawings and the description below. Other features, aspects and advantages of the disclosed subject matter will become apparent from the description, the drawings and the claims.

DETAILED DESCRIPTION

Figure 1:
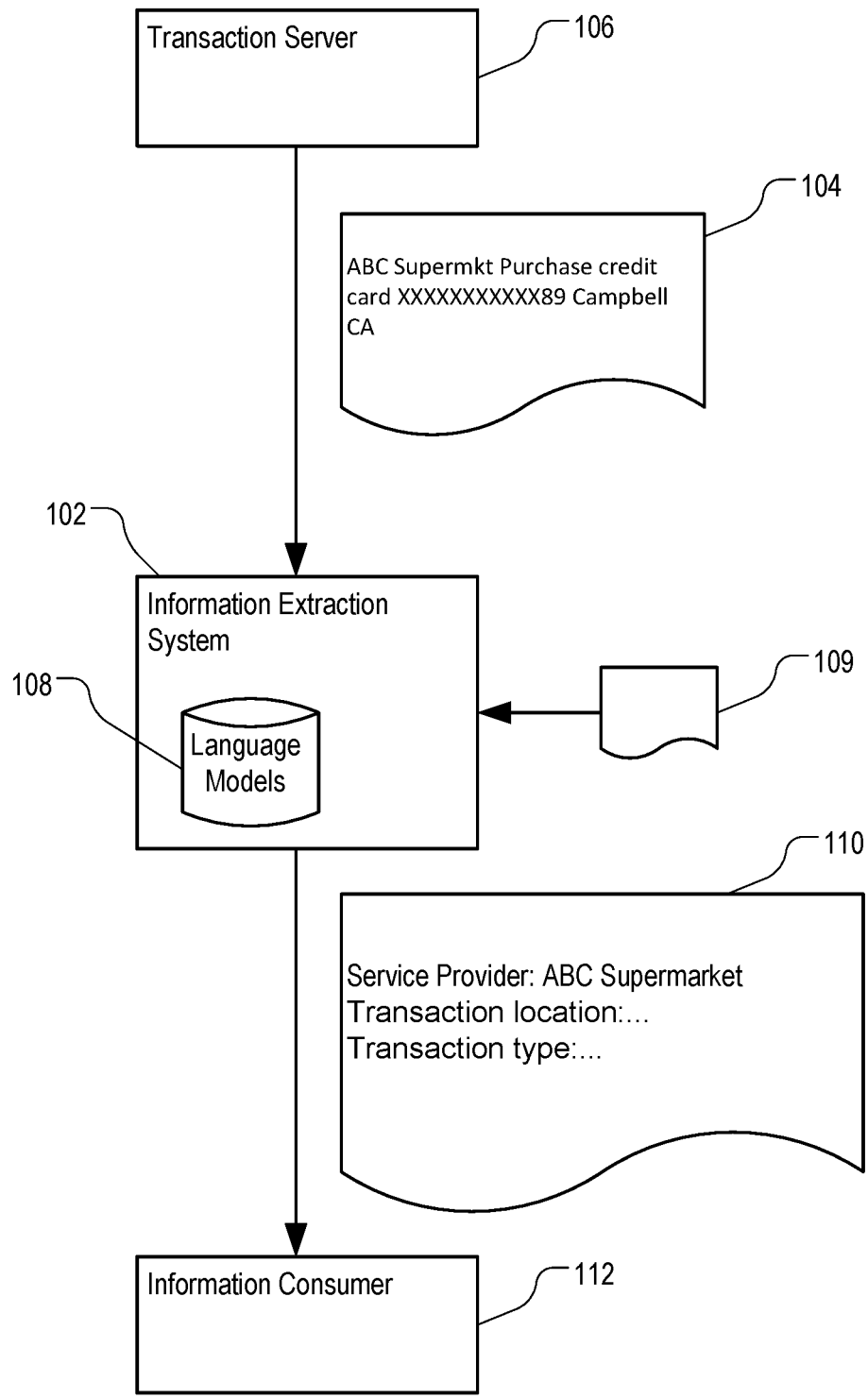
FIG. 1 is a block diagram illustrating an example information extraction system processing transaction data.

FIG. 1 is a block diagram illustrating an example information extraction system processing transaction data. The operations and procedures described in reference to FIG. 1 are performed by an information extraction system 102. The information extraction system 102 can include one or more computers each having one or more hardware computer processors.

The information extraction system 102 receives transaction data 104 from a transaction server 106. The transaction data 104 includes one or more transaction records. A transaction can be an instance of interaction between a first user and a second user (e.g., between two humans), a user and a computer, or a first computer and a second computer, that has been recorded by the transaction server 106. The transaction can be served by, or take place at, a service provider. The transaction server 106 can include one or more computers configured to feed transactions aggregated from service providers. The service providers can provide transaction information to be aggregated. The transaction server 106 can generate the transaction data 104 by performing a lookup at another server using a service provider code.

The transaction server 106 includes one or more storage devices storing the transactional data 104. Examples of a transaction server 106 include a log server, an action data store, or a general ledger managing computer of various agencies. The agencies can include, for example, an interactive content provider, e.g., a news provider that allows readers to posts comments; an on-line shop that allows users to buy goods or services, e.g., prescription medicine or pet food, a healthcare network that serves new and existing patients, or a financial services provider, e.g., a bank or credit card company that tracks financial transactions.

Each record in the transaction data 104 can have multiple entities. Each entity is a section of the record including one or more characters. Each entity has a specific meaning. The entities in a record can include, for example, an identifier entity storing a transaction identifier identifying the transaction represented by the record (e.g., "1234-5678"). The entities can include a name entity storing a customer name (e.g., "Joe McDonald"). The entities can include a value entity storing a transaction amount. The entities can include a provider entity storing a service provider identifier (e.g., a shop named "ABC Supermarket"). The entities can include a mode entity storing a transaction mode (e.g., "gift certificate," "check," or "credit card"). The entities can include a description entity storing a transaction description. The transaction description can be free-form text string, and may include, for example a name of an item purchased, or in this example shown, one or more numbers (e.g., "123456789-0987654321"). In general, each transaction record can be a raw string of a transaction. The entities in the raw string may not be delimited by a delimiting character, e.g., a space or tab character.

Due to various factors, e.g., different ways two transaction servers 106 are programmed, the transaction records in the transaction data 104 may not be easily parsed by a computer. For example, the service provider name "ABC Supermarket" may be shortened as "ABC Supermkt" in a particular transaction record but not in other transaction records. The service provider name may be buried among background information. In this example, the background information is "Purchase credit card XXXXXXXXXXX89 Campbell CA."

The service provider name may not be located at a uniform location across transaction records. The service provider name may not be separated from the background information by a delimiter. Such diversity can pose challenges to a computer program to retrieve information from the transaction records to enrich the transaction data 104.

The information extraction system 102 is configured to recognize reliably the service provider name from the transaction record in spite of these challenges. The information extraction system can recognize the service provider names using multiple language models 108. The language models 108 include parameters of different neural network models. For example, the language models 108 can include learnable parameters in a CNN. The learnable parameters of the CNN can include weights, biases, and kernels. The kernels function as feature detectors in place of token level features. The language models 108 can include learnable parameters in an RNN. The learnable parameters in the RNN can include weights, biases, word embeddings and character embeddings.

The information extraction system 102 can build the language models 108 from training data 109 in one or more learning processes. The information extraction system 102 can build the language models 108 before processing the transaction data 104. Alternatively or additionally, the information extraction system 102 can build the language models 108 concurrently with processing the transaction data 104 in an iterative process. In some implementations, the information extraction system 102 builds the language models 108 using an iterative approach of having a trained classifier label the training data. The information extraction system 102 labels the very first set of training data using an unsupervised classifier. The initial classifier is trained on this data, and then labels the input training data. For documents where the classification by the CNN differs from the original training data, the information extraction system 102 outputs a set of differences for review. After review, a new model is trained and the process continues. This approach produces labeled data efficiently. Source training data from unsupervised approaches can be relatively noisy. New training data sampled broadly from new service providers may be labeled by the most recent classifier before being reviews by labelers. New classes are sourced from the NULL class.

In addition to recognizing the service provider name from the transaction record, the information extraction system 102 can categorize other portions of the transaction record based on the language models 108. Categorization can include identifying entities from background information and labeling the identified entities. For example, the information extraction system 102 can identify and label a substring (e.g., a city and a state) of the transaction record as a transaction location. The information extraction system 102 can identify and label another substring (e.g., a word "deposit" or "withdrawal") of the transaction record as a transaction type.

The transaction data 104 can include transaction records from service providers having various sizes. The sizes of the service providers can correspond to number of transactions recorded in the transaction data 104. Distribution of service providers within the transaction data 104 can be such that a small number, e.g., one percent, of all distinct service providers, make up a large proportion, e.g., over 50 percent, of transaction records in the transaction data 104. These service providers can include large service providers, franchised service providers, or both. The information extraction system 102 can designate these service providers as first category providers. The remaining transactions can belong to smaller or non-franchised providers. The information extraction system 102 can designate these service providers as second category providers. The first category service providers are known to the information extraction system 102. A service provider is known to the information extraction system 102 if a canonical, well-formatted name of that service provider is stored in the information extraction system 102. The second category service providers are unknown to the system. While there may only be, for example, a few thousand first category providers in one half of the transaction data 104, there may be millions of second category providers in the other half.

The information extraction system 102 determines service provider names in such a way that each first category provider can have a consistent uniform name across all transaction records, even if the names of that first category provider vary among transaction records, e.g., spelled as "ABC Supermarket" in some transaction records and "ABC Supermkt" in other transaction records. In particular, the information extraction system 102 can have the technical advantage over conventional systems in that even if a name is spelled in a way, e.g., "ABC s-market," that never appeared in the training data 109, the information extraction system 102 can recognize that the name belongs to a first category service provider. The class that is output by the CNN is a neuron number that corresponds to a number class. The information extraction system 102 uses this number to look up a well-formatted name. For the CNN, all of the classes are service provider names except for a NULL class. The NULL class represents second category providers. Accordingly, the CNN can have a respective class for each known service provider, and a single NULL class for unknown service providers. The RNN then handles unknown service providers.

For the second category providers, the training data 109 may only contain a small number, e.g., one or two, examples, or no examples at all. The RNN learns what character patterns constitute a particular entity. From a large number, e.g., hundreds of thousands, of examples of service providers in transactions, the RNN learns what sequences of characters identify service providers. For example, there may be the following merchants in the training set "Matthew's General Store," "Betty's Bazaar," "Fred's Fabric," and "Badieu's Boats." If an RNN encounters a sequence of characters "Matthieu's Fabric Bazaar" in a transaction, even though the sequence was not in the training data, the RNN will correctly identify "Matthieu's Fabric Bazaar" as a service provider name. In such situations, the information extraction system 102 can identify, from each transaction record, which part of the transaction record is most likely a service provider name.

The information extraction system 102 generates a transaction report 110. In the transaction report 110, the information extraction system 102 can present various forms of information that enriches the transaction data 104. For example, the transaction report 110 can include delimited transaction records where a delimiter is inserted between entities, e.g., a service provider name and a location, even when the original transaction record contains concatenated entities without delimiters.

In addition, the transaction report 110 can include one or more respective labels for each transaction record. A label can indicate a category of the transaction recorded in the corresponding transaction record. The category of the transaction can be, for example, a service provider name, a category type, or a transaction type. The service provider name can be a canonical name of the service provider, correctly spelled, despite any possible misspells or shortenings in the original transaction record. A label can indicate an entity type of an entity in a transaction record. Each entity may have a respective label in the transaction report.

In addition, the transaction report 110 can include statistics on the transactions, e.g., how many transactions occurred for each service provider, grouped by canonical service provider names. The information extraction system 102 can provide the transaction report 110 to one or more information consuming devices 112 for consumption. An information consuming devices 112 can include one or more computers configured to analyze the transaction report 110 for various purposes, e.g., for determining content download patterns, predicting usage demand, forecasting network traffic, among others.

Figure 2:
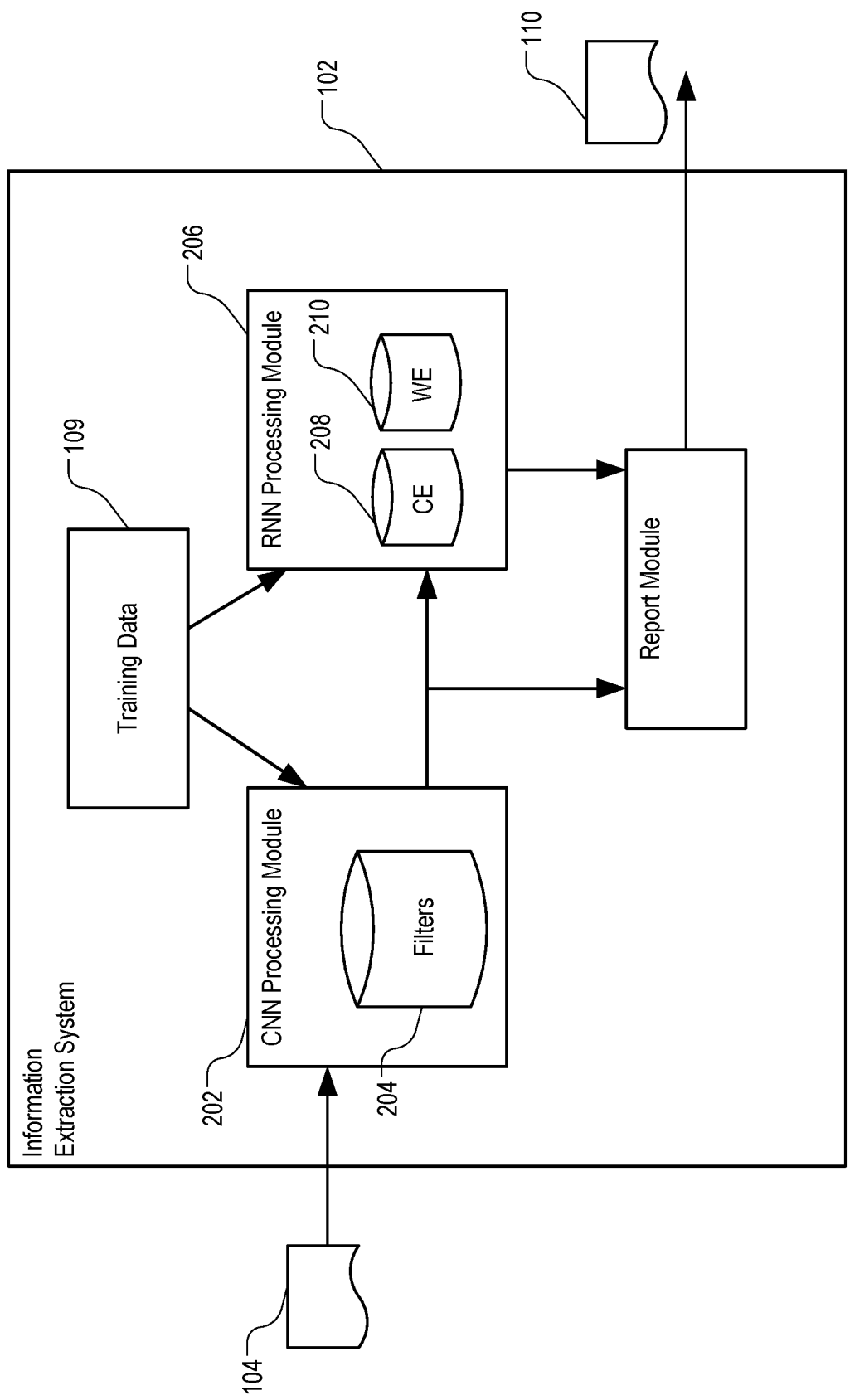
FIG. 2 is a block diagram illustrating example neural network modules in an information extraction system.

FIG. 2 is a block diagram illustrating example neural network modules in an information extraction system 102. The information extraction system 102 can include neural network modules configured to perform information extraction at various stages. Each neural network module can include one or more hardware computer processors programmed to perform corresponding functions.

An example strategy of the information extraction system 102 for generating the transaction report 110 is to both label a transaction record as a whole, and also tag individual entities of the transaction record by respective entity types. The labeling and tagging are based on character-level, or both character-level and word-level, information from transaction records, depending on what model is used. The information extraction system 102 can achieve full coverage of the transaction data 104 by applying multiple separate character-level models. The information extraction system 102 can identify most common attributes using a one-dimensional CNN. The information extraction system 102 can identify entities within the transaction record using a BI-LSTM. An entity can include, for example, a service provider name, a transaction location, or a transaction amount. An entity can include one or more tokens. An entity type can be a label of an entity. For example, the information extraction system 102 can determine that in a transaction record, "ABC Supermarket" is an entity. The information extraction system 102 can determine that the entity type of this entity is service provider name.

The information extraction system 102 includes a CNN processing module 202. The CNN processing module 202 is a component of the information extraction system 102 including one or more processors configured to classify each transaction represented by a respective transaction record, as a whole, using the fully connected network. The CNN processing module 202 performs character-level processing. The CNN processing module 202 includes a one-dimensional convolutional neural network where textual data are encoded via a one-of-m encoding for each character.

The CNN processing module 202 learns a collection of parameters 204 in a multi-layer neural network. The parameters 204 are learnable parameters that include kernels, weights, and biases. The parameters 204 are a portion of the language models 108 of FIG. 1. The CNN processing module 202 learns character sequences and patterns, e.g., "ABC" that is a part of a service provider name "ABC Supermarket" and the like, that are useful in classifying the transaction data 104 from training data 109 in a sequential manner where the inputs to one layer of feature detectors are the outputs of a previous layer. The CNN processing module 202 designates a respective numerical representation of these character sequences as a kernel in the parameters 204. The numerical representation can be a one-dimensional array of weights. The multi-layer one-dimensional neural network can include convolutional layers and one or more pooling layers. A first layer in a one-dimensional convolutional network can correspond to a representation of the transaction record. The representation can be a numerical representation of characters in the transaction record.

The CNN processing module 202 can slide, also referred to as convolve, each of the kernels across the first layer, through a series of receptive fields of the first layer. Each receptive field can be a section of the first layer having a size corresponding to the size of the array in the kernel. The first layer is a convolutional layer. The CNN processing module 202 sums biases to the output of the convolutional layer and feeds the sum into a pooling layer. The pooling layer reduces a spatial size of the representation and reduces the amount of parameters and computation in the network. The pooling layer can feed its output into a next convolutional layer. As the CNN processing module 202 slides a kernel across the first layer, the CNN processing module 202 multiplies the numerical representation of characters in the transaction record with the weights in the kernel. The CNN processing module 202 sums the result of the multiplication to derive a respective number that represents each corresponding receptive field. The CNN processing module 202 can then feed the generated numbers through a nonlinearity if it is a convolutional or fully connected layer. This output can then serve as input of the next layer. The one-dimensional convolutional network includes multiple layers. The CNN processing module 202 can determine each layer by sliding kernels in the parameters 204 through a previous layer.

The CNN processing module 202 feeds output of this one-dimensional convolutional network into a conventional fully connected feed forward network for classification. The classification can result in a category of the transaction record, e.g., whether the transaction represented by the record is performed by or occurred at a first category service provider or a second category service provider. Output of the CNN processing module 202 can include a neuron number, which corresponds to a number class. Each number class corresponds to a service provider name. The CNN processing module 202, or another component of the information extraction system 102, can perform a lookup for a well formatted service provider name using this number class.

The CNN processing module 202 can batch transactions together and use the average error from the documents to update the parameters in the training step. The CNN can accelerate training for the parameters 204 using batch normalization. Sampling of transactions in each batch involves the following process. Transactions can be sampled in one of two ways. First, the transactions can be randomly sampled from the whole population of documents; or, second, for each transaction in the batch, the system can randomly select a class, and then randomly select a transaction from that class. In the first case, the network will have high accuracy on the NULL class but lower accuracy on known service providers. In the second case, the network will have high accuracy for known service providers but lower accuracy on unknown service providers. In order to ensure accuracy regardless of the distribution of training data being provided, hence only requiring low skilled workers, a first portion, e.g., 50%, of the batch is sampled via the first method, and a second portion, e.g., 50%, is sampled via the second method. This ensures good results even if there is poor sampling on the training data. The numbers 50% and 50% are provided as examples. Other ratios are possible.

The CNN processing module 202 can use dropout in regularization. The CNN processing module 202 segregates the training data 109. The CNN processing module 202 can collect a sample across known service providers, for example, the top N service providers which account for X percent (e.g., 50%) of the training data. The CNN processing module 202 can label these transaction records as belong to first category providers. The CNN processing module 202 can group remaining transaction records into a different class, e.g., a singular NULL class. Output of CNN processing module 202 that corresponds to transaction records belonging to the NULL class is then fed forward to an RNN processing module 206 of information extraction system 102. The RNN training data can include small amounts of samples from first category providers as well, to improve accuracy. The majority of the training data is from the NULL class.

The RNN processing module 206 includes one or more computers trained to identify entities within a transaction record using multiple BI-LSTM models. The BI-LSTM models can perform both character-level processing and token-level processing. The RNN processing module 206 can identify the service provider name within a transaction record using the BI-LSTM models, despite challenges including, for example, varied locations, shortening, misspell, and lack of delimiter.

The BI-LSTM models include a first-level model. The first-level model of the RNN processing module 206 can be a BI-LSTM model, or another model, that encodes tokens in a transaction record at a character-level. A token in a transaction record can be a character sequence having an arbitrary length. A token may not be clearly delimited from another token. The first-level model of the RNN processing module 206, by encoding tokens in a transaction record at a character level, can recognize the tokens even if the tokens are not delimited or contain delimiters, e.g., spaces, within, or if the tokens have never been exposed to the RNN processing module 206.

The first-level model can be a many-to-one BI-LSTM model. The first-level model receives, as input, a sequence of character embedding instances. Each character is a fixed size (e.g., length 64) learnable embedding. The RNN processing module 206 feeds the character embedding instances into the BI-LSTM, where tokens are fed one character at a time, using a character embedding lookup. The RNN processing module 206 generates an output that is dependent on a layer size of the BI-LSTM, e.g., 50. When feeding into a next BI-LSTM, the word embedding is concatenated to a forward pass and a backward pass.

A representation of the sequence contains character level information. The representation of the sequence can be the output of the forward pass of a first-level LSTM, or both the forward and backward passes making the first-level LSTM a BI-LSTM. The representation of the sequence can be the output of a one-dimensional CNN described below. The two representations of the character sequence are concatenated, one representing the token as a singular unit, and one representing the token as a collection of characters in some abstract form. At this stage, in practice these numbers being concatenated are not discernible. A significant difference is the source of each encoding being concatenated. If the fixed size of the word embeddings is 64 and the characters are encoded using a BI-LSTM, then the input to the next BI-LSTM would be of size 64+50+50=164. The RNN processing module 206 can have a character embedding data store that stores multiple instances of character embedding. The RNN processing module 206 can update the instances of character embedding during a learning process, based on training data 109. In some implementations, the RNN processing module 206 can encode character-level information using a one-dimensional CNN with similar properties as those of the model used by the CNN processing module 202.

The RNN processing module 206 can concatenate an entire output from the first-level BI-LSTM to an instance of a word embedding. The word embedding encodes semantic relationships between tokens. The RNN processing module 206 can use pre-trained instances of word embedding and then continue to train them. Alternatively, the RNN processing module 206 can start from randomized embeddings. The RNN processing module 206 can store the instances of word embedding in a word embedding data store. The RNN processing module 206 has parameters 208. The parameters 208 of the RNN process are learnable parameters that include weights, one or more biases, character embeddings and word embeddings.

Regardless of the source of the token level representations and the representations containing character level information, the RNN processing module 206 feeds a final representation of a token, e.g., each word, number, or arbitrary character sequence, sequentially into a second-level model. The second-level model can be a BI-LSTM model that has a higher level, e.g., token level, than the first level, e.g., character level, of the first-level BI-LSTM model. The second-level BI-LSTM model takes as input a batch of the tokens represented by their encodings as produced by a one-dimensional CNN or first-level BI-LSTM model.

The second-level BI-LSTM model can be a many-to-many BI-LSTM model. The second-level BI-LSTM classifies each token using the output state of the first-level BI-LSTM model or output of a CNN configured to encode character level information into a fixed size representation. The RNN processing module 206 feeds each transaction record in both a forward manner as well as a reversed manner. Feeding each transactions in both directions allows both tokens prior to the current token and tokens after the current token to be bases for classifying the current token.

The RNN processing module 206 can concatenate outputs of the second-level BI-LSTM model. The RNN processing module 206 can concatenate a forward pass and a reversed backward pass together. The RNN processing module 206 can feed the concatenated outputs to a softmax layer. During training, noise is applied from random values from a normal distribution at this stage. Noise is not applied when the model is not training. This process is similar to the regularization stage in the CNN designated as dropout. Regularization allows the model to identify tokens not present in the training data. The softmax layer is a component of the RNN processing module 206 configured to produce a probability vector for each token in a batch.

The RNN processing module 206 can learn the instances of character embedding and instances of word embedding from the training data 109. The training data 109 include transaction records and truth data. The truth data can indicate that a particular entity in a given transaction record in the training data 109 has certain entity type, e.g., is a service provider name. The RNN processing module 206 can perform the learning to populate the character embedding data store and the word embedding data store when the network has been exposed to a set of one or more transactions. The network can be optimized relative to provided training data. A forward pass of the network alone does not update the weights. The backward pass of back propagation that is optimized using stochastic gradient descent (SGD) is a stage that updates the character and word embeddings. The instances of character embedding and instances of word embedding are components of the language model 108 of FIG. 1. Both the CNN processing module 202 and the RNN processing module 206 can optimize their respective language models, e.g., by using back propagation in conjunction with SGD for optimization of parameters.

Figure 3:
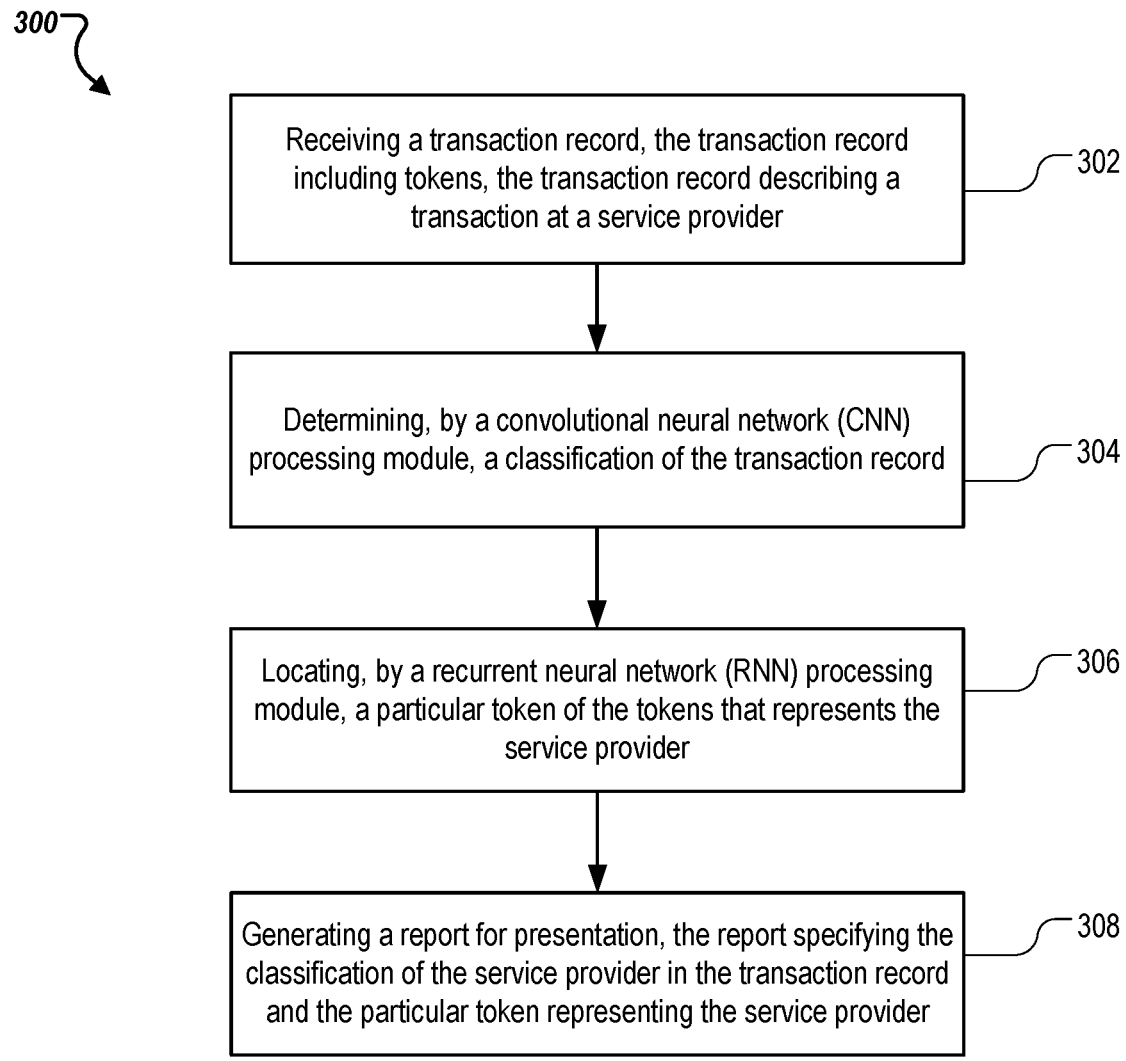
FIG. 3 is a flowchart illustrating an example process of information extraction by multiple neural networks.

FIG. 3 is flowchart illustrating an example process 300 of information extraction by multiple neural networks. The operations of FIG. 3 can be performed by a system including one or more computer processors, e.g., the information extraction system 102 of FIG. 1.

The system receives (302) transaction data. The transaction data includes one or more transaction records. Each transaction record describes a respective transaction at a service provider, e.g., a transaction served by the service provider, occurred on a server computer of the service provider, or recorded at a point-of-sale (POS) device of the service provider. Each transaction record includes one or more tokens. Each token can be a character sequence, e.g., a word ("Supermkt") or a number ("123.45"), having an arbitrary length. The tokens may not be clearly separated from one another. For example, the tokens may be concatenated without a delimiting character (e.g., "ABC SupermktCampbellCA") and/or in lowercase (e.g., "abcsupermkt-cambellca").

The system determines (304), using a CNN processing module, a respective classification of each transaction record based on a collection of one or more learnable parameters. The one or more learnable parameters for the CNN can include kernels, weights and biases. The CNN processing module learns the kernels from training data. The classification indicates whether the service provider is a first category provider, e.g., a known, typically relatively large service provider, or a second category provider, e.g., an unknown, typically relatively small service provider. For a first category provider, the class in the classification can be a service provider name. For others, the final class can be a NULL class. The training data includes truth data, e.g., a correctly spelled name of each service provider. A distinct class of a service provider separates the class from other classes. The training data does not need to include a misspelled or shortened name of a service provider, provided that regularization is applied via noise, dropout or manual character mutations. The truth data can include confirmed locations of known entity types such as service provider in the transaction records.

In some implementations, the system selects training data based on service provider size. Of all transaction records, the system separates transactions served by first category (known, and typically large) service providers and second category (unknown, and typically small) service providers. Accordingly, the training data includes a sample of transactions served by a subset of all service providers. The subset can be selected from all service providers based on a ratio between a number of transactions served by the subset of service providers over a number of transactions served by all service providers.

Determining the classification of a transaction record can include the following operations. The CNN processing module can transform a representation of the transaction record through a series of convolutional layers. The CNN processing module can generate or populate each layer by sliding one or more kernels of the collection of kernels over the output of a previous convolutional layer, or output of a pooling layer. One convolutional layer can feed directly to another convolutional layer. Each kernel can be a one-dimensional array of weights. The CNN processing module can determine the classification of the transaction record based on a final layer in the series by feeding an output of the transforming to a fully connected feed forward network. The final layer before feeding into the fully connected feed forward network can be a pooling layer. There can be a reshape layer which does not change the data but flattens the data.

Upon determining that the service provider in a particular transaction record is a first category service provider by looking up an output class number which is not NULL, the system can output a name of the service provider. The system can classify the transaction represented by the transaction record as a transaction served by a first category service provider.

Upon determining that the service provider in a particular transaction record is a second category service provider, an RNN processing module of the system recognizes and locates (306) an entity in the transaction record that represents the service provider. The entity includes one or more particular tokens of the tokens in the transaction record. Applying learnable parameters of the RNN, the RNN processing module can locate the entity even when the one or more tokens in the entity include a misspelled name or shortened name of the service provider and even when the system never encountered the misspelled name or shortened name, or never encountered the service provider at all. For example, the misspelled name or shortened name need not be in the training data. The learnable parameters of the RNN can include weights, one or more biases, character embeddings and word embeddings. The RNN processing module can learn these parameters from the training data.

Locating the particular token that represents the service provider can include the following operations. The RNN processing module can scan each token in the transaction record using a first-level model. The first-level model is a character-level model. The character-level model can be a LSTM model, a BI-LSTM model, or a one-dimensional CNN. The character-level model is a many-to-one BI-LSTM model. Scanning the transaction record by the first BI-LSTM model can include a character-level forward scan and a character-level backward scan. Each character-level scan can generate a respective fixed-width state vector. The state vector includes one or more states, which are numerical representations of characters. As a result of the scans, each token is represented as a respective fixed size vector containing character level information. The RNN processing module concatenates outputs of the first BI-LSTM model to a word embedding and then feeds the concatenated output into a second BI-LSTM.

The RNN processing module can scan a representation of the transaction record using the second-level model based on output of the character level encoding of tokens. The second-level model can be a token-level BI-LSTM model. The token-level BI-LSTM model is a many-to-many BI-LSTM model. The scanning by the second-level model can include a token-level forward scan and a token-level backward scan. The RNN processing module concatenates the forward and backward passes of the second-level model into a fixed size output. The RNN processing module feeds the fixed size output into a softmax layer that produces a respective probability vector for each token. The RNN processing module determines that the particular token represents the service provider based on results of the classifying.

The system generates (308) a report. The report can include enriched transaction data. The report specifies the classification of a respective service provider in each transaction record and the particular token representing the service provider in the transaction record. The system can provide the report to an information consumer, e.g., a data mining server for further processing, for storage, or for output to a display device or a printing device.

Exemplary System Architecture

Figure 4:
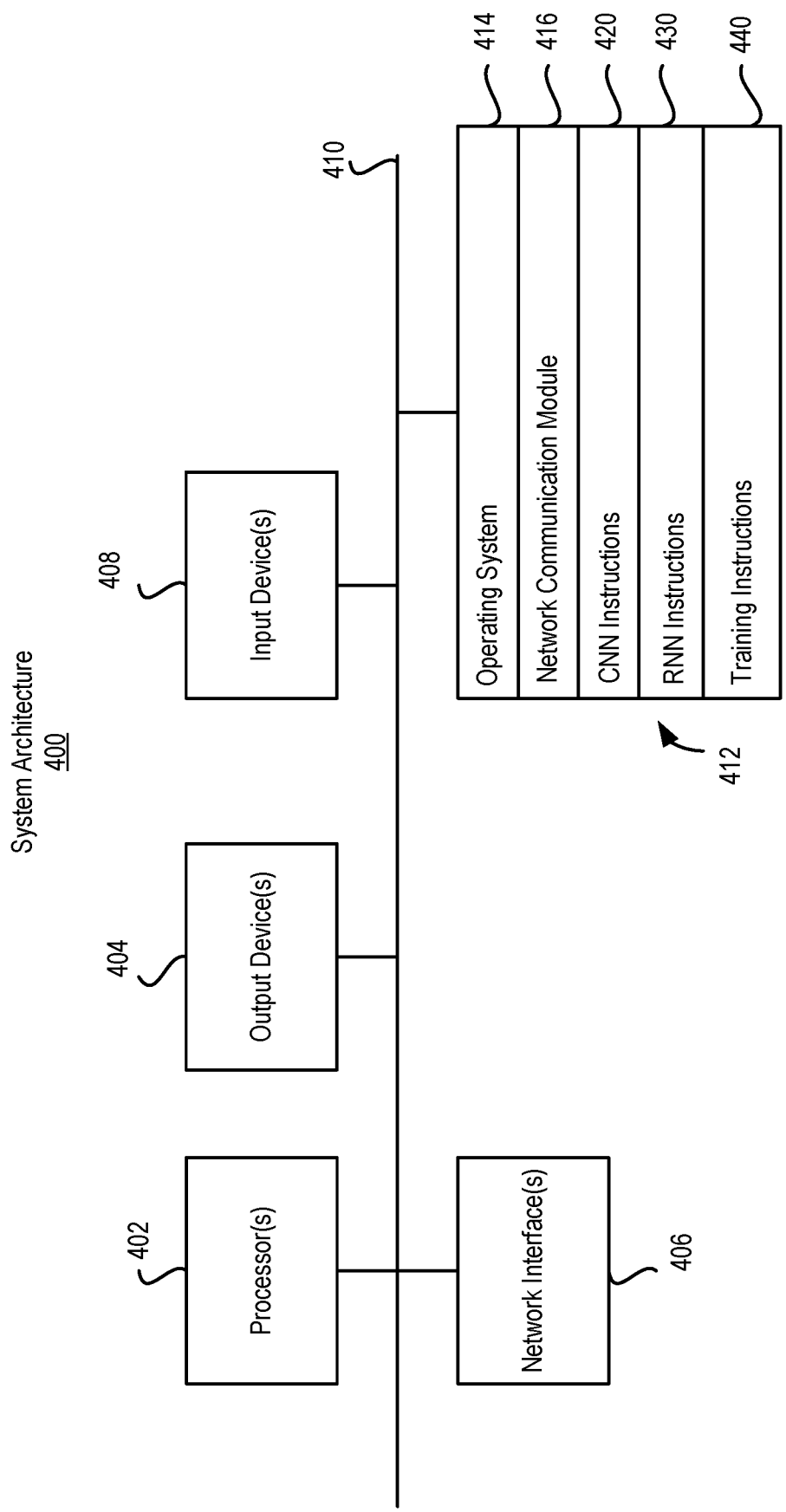
FIG. 4 is a block diagram illustrating an example architecture for implementing the features and operations described in reference to FIGS. 1-3.

FIG. 4 is a block diagram of an example system architecture for implementing the systems and processes of FIGS. 1-3. Other architectures are possible, including architectures with more or fewer components. In some implementations, architecture 400 includes one or more processors 402 (e.g., dual-core Intel® Xeon® Processors), one or more output devices 404 (e.g., LCD), one or more network interfaces 406, one or more input devices 408 (e.g., mouse, keyboard, touch-sensitive display) and one or more computer-readable mediums 412 (e.g., RAM, ROM, SDRAM, hard disk, optical disk, flash memory, etc.). These components can exchange communications and data over one or more communication channels 410 (e.g., buses), which can utilize various hardware and software for facilitating the transfer of data and control signals between components.

The term "computer-readable medium" refers to a medium that participates in providing instructions to processor 402 for execution, including without limitation, non-volatile media (e.g., optical or magnetic disks), volatile media (e.g., memory) and transmission media. Transmission media includes, without limitation, coaxial cables, copper wire and fiber optics.

Computer-readable medium 412 can further include operating system 414 (e.g., a Linux® operating system), network communication module 416, CNN instructions 420, RNN instructions 430 and training instructions 440. Operating system 414 can be multi-user, multiprocessing, multitasking, multithreading, real time, etc. Operating system 414 performs basic tasks, including but not limited to: recognizing input from and providing output to devices 406, 408; keeping track and managing files and directories on computer-readable mediums 412 (e.g., memory or a storage device); controlling peripheral devices; and managing traffic on the one or more communication channels 410. Network communications module 416 includes various components for establishing and maintaining network connections (e.g., software for implementing communication protocols, such as TCP/IP, HTTP, etc.).

CNN instructions 420 can include computer instructions that, when executed, cause processor 402 to perform functions of the CNN processing module 202 of FIG. 2. RNN instructions 430 can include computer instructions that, when executed, cause processor 402 to perform functions of the RNN processing module 206 of FIG. 2. Training instructions 440 can include computer instructions that, when executed, cause processor 402 to determine kernels, biases and weights of a CNN model, weights, biases, character embedding instances and word embedding instances of an RNN model.

Architecture 400 can be implemented in a parallel processing or peer-to-peer infrastructure or on a single device with one or more processors. Software can include multiple software components or can be a single body of code.

The described features can be implemented advantageously in one or more computer programs that are executable on a programmable system including at least one programmable processor coupled to receive data and instructions from, and to transmit data and instructions to, a data storage system, at least one input device, and at least one output device. A computer program is a set of instructions that can be used, directly or indirectly, in a computer to perform a certain activity or bring about a certain result.

A computer program can be written in any form of programming language (e.g., Objective-C, Java), including compiled or interpreted languages, and it can be deployed in any form, including as a stand-alone program or as a module, component, subroutine, a browser-based web application, or other unit suitable for use in a computing environment.

Suitable processors for the execution of a program of instructions include, by way of example, both general and special purpose microprocessors, and the sole processor or one of multiple processors or cores, of any kind of computer. Generally, a processor will receive instructions and data from a read-only memory or a random access memory or both. The essential elements of a computer are a processor for executing instructions and one or more memories for storing instructions and data. Generally, a computer will also include, or be operatively coupled to communicate with, one or more mass storage devices for storing data files; such devices include magnetic disks, such as internal hard disks and removable disks; magneto-optical disks; and optical disks. Storage devices suitable for tangibly embodying computer program instructions and data include all forms of non-volatile memory, including by way of example semiconductor memory devices, such as EPROM, EEPROM, and flash memory devices; magnetic disks such as internal hard disks and removable disks; magneto-optical disks; and CD-ROM and DVD-ROM disks. The processor and the memory can be supplemented by, or incorporated in, ASICs (application-specific integrated circuits).

To provide for interaction with a user, the features can be implemented on a computer having a display device such as a CRT (cathode ray tube) or LCD (liquid crystal display) monitor or a retina display device for displaying information to the user. The computer can have a touch surface input device (e.g., a touch screen) or a keyboard and a pointing device such as a mouse or a trackball by which the user can provide input to the computer. The computer can have a voice input device for receiving voice commands from the user.

The features can be implemented in a computer system that includes a back-end component, such as a data server, or that includes a middleware component, such as an application server or an Internet server, or that includes a front-end component, such as a client computer having a graphical user interface or an Internet browser, or any combination of them. The components of the system can be connected by any form or medium of digital data communication such as a communication network. Examples of communication networks include, e.g., a LAN, a WAN, and the computers and networks forming the Internet.

The computing system can include clients and servers. A client and server are generally remote from each other and typically interact through a communication network. The relationship of client and server arises by virtue of computer programs running on the respective computers and having a client-server relationship to each other. In some embodiments, a server transmits data (e.g., an HTML page) to a client device (e.g., for purposes of displaying data to and receiving user input from a user interacting with the client device). Data generated at the client device (e.g., a result of the user interaction) can be received from the client device at the server.

A system of one or more computers can be configured to perform particular actions by virtue of having software, firmware, hardware, or a combination of them installed on the system that in operation causes or cause the system to perform the actions. One or more computer programs can be configured to perform particular actions by virtue of including instructions that, when executed by data processing apparatus, cause the apparatus to perform the actions.

While this specification contains many specific implementation details, these should not be construed as limitations on the scope of any inventions or of what may be claimed, but rather as descriptions of features specific to particular embodiments of particular inventions. Certain features that are described in this specification in the context of separate embodiments can also be implemented in combination in a single embodiment. Conversely, various features that are described in the context of a single embodiment can also be implemented in multiple embodiments separately or in any suitable subcombination. Moreover, although features may be described above as acting in certain combinations and even initially claimed as such, one or more features from a claimed combination can in some cases be excised from the combination, and the claimed combination may be directed to a subcombination or variation of a subcombination.

Similarly, while operations are depicted in the drawings in a particular order, this should not be understood as requiring that such operations be performed in the particular order shown or in sequential order, or that all illustrated operations be performed, to achieve desirable results. In certain circumstances, multitasking and parallel processing may be advantageous. Moreover, the separation of various system components in the embodiments described above should not be understood as requiring such separation in all embodiments, and it should be understood that the described program components and systems can generally be integrated together in a single software product or packaged into multiple software products.

Thus, particular embodiments of the subject matter have been described. Other embodiments are within the scope of the following claims. In some cases, the actions recited in the claims can be performed in a different order and still achieve desirable results. In addition, the processes depicted in the accompanying figures do not necessarily require the particular order shown, or sequential order, to achieve desirable results. In certain implementations, multitasking and parallel processing may be advantageous.

A number of implementations of the invention have been described. Nevertheless, it will be understood that various modifications can be made without departing from the spirit and scope of the invention.

What is claimed is:

1. A method comprising:
   receiving, by an information extraction system including one or more processors, a transaction record, the transaction record including a plurality of tokens, the transaction record describing a transaction served by a service provider;
   determining, by a convolutional neural network (CNN) processing module of the information extraction system, a classification of the transaction record based on a collection of parameters that the CNN processing module learned from first training data, the determining comprising
      determining whether the service provider is known to the information extraction system or not known to the information extraction system,
      if determining that the service provider is known to the information extraction system, generating a class label identifying a name of the service provider, and
      if determining that the service provider is not known to the information extraction system, generating a predetermined class label indicating that the service provider is not a known service provider, wherein the CNN processing module has been configured through training to generate the predetermined class label in response to processing a transaction record corresponding to a service provider that is not known to the information extraction system;

in response to determining that the service provider is not known to the information extraction system, as indicated by the generation of the predetermined class label by the CNN processing module, triggering a recurrent neural network (RNN) processing module of the information extraction system, comprising locating, by the RNN processing module and based at least in part on a character embedding model and a word embedding model both of which the RNN processing module learned from second training data, a particular token of the plurality of tokens of the transaction record, wherein the particular token identifies the name of the service provider; and generating, by the information extraction system, a report specifying the name of the service provider in the transaction record.

2. The method of claim 1, wherein:

each service provider that is known to the information extraction system serves more transactions than each service provider that is not known to the information extraction system, each token is a character sequence having an arbitrary length, the first training data includes a plurality of first examples, wherein each first example includes a class number associated with a name, and the second training data includes a plurality of second examples, wherein each second example includes character begin and end positions of one or more entities.

3. The method of claim 1, wherein determining the classification of the transaction record comprises:

transforming a representation of the transaction record through a series of convolutional layers and pooling layers, each layer being generated by sliding one or more kernels over an output of a previous convolutional layer; and determining the classification of the transaction record based on a final pooling layer of the pooling layers by feeding an output of the transforming to a fully connected feed forward network.

4. The method of claim 1, wherein the first training data comprises a sample of transactions served by a subset of all service providers, the subset being selected from all service providers based on a ratio between a number of transactions served by the subset of service providers over a number of transactions served by all service providers.

5. The method of claim 1, wherein locating the particular token comprises:

scanning each token in the transaction record by a character-level model to generate a character-level output, wherein the scanning is based on character embedding instances corresponding to characters in the transaction record;

generating a respective initial representation of each token in the transaction record from the character-level output;

scanning the initial representations of each token in the transaction record by a token-level model to generate a token-level output, the scanning by the token-level model including a token-level forward scan and a token-level backward scan;

generating a respective final representation of each token in the transaction record from the token-level output;

classifying each token by feeding final representations of the tokens to a softmax layer that produces a respective probability vector for each token; and determining that the particular token identifies the name of the service provider based on results of the classifying.

6. The method of claim 5, wherein the character-level model is a long short-term memory (LSTM) model, a many-to-one bidirectional LSTM (BI-LSTM) model, or a one-dimensional CNN model, and the token-level model is a many-to-many BI-LSTM model.

7. The method of claim 5, wherein:

the character-level model is a many-to-one bi-directional long short-term memory (BI-LSTM) model and the token-level model is a many-to-many BI-LSTM;

scanning each token in the transaction record by the character-level model comprises, for each token in the transaction record, performing a character-level forward scan of the character embedding instances of the token to generate a forward character-level representation of the token, and performing a character-level backward scan of the character embedding instances of the token to generate a backward character-level representation of the token; and generating a respective initial representation of each token in the transaction record comprises, for each token in the transaction record, concatenating i) the forward character-level representation of the token, ii) the backward character-level representation of the token, and iii) a word embedding corresponding to the token.

8. The method of claim 1, wherein the particular token includes a misspelled or shortened name of the service provider.

9. A system comprising:

one or more processors; and a non-transitory computer-readable medium storing instructions that, when executed by the one or more processors, cause the one or more processors to perform operations comprising:

receiving, by an information extraction system including one or more processors, a transaction record, the transaction record including a plurality of tokens, the transaction record describing a transaction served by a service provider;

determining, by a convolutional neural network (CNN) processing module of the information extraction system, a classification of the transaction record based on a collection of parameters that the CNN processing module learned from first training data, the determining comprising determining whether the service provider is known to the information extraction system or not known to the information extraction system, if determining that the service provider is known to the information extraction system, generating a class label identifying a name of the service provider, and if determining that the service provider is not known to the information extraction system, generating a predetermined class label indicating that the service provider is not a known service provider, wherein the CNN processing module has been configured through training to generate the predetermined class label in response to processing a transaction record corresponding to a service provider that is not known to the information extraction system;

in response to determining that the service provider is not known to the information extraction system, as indicated by the generation of the predetermined class label by the CNN processing module, triggering a recurrent neural network (RNN) processing module of the information extraction system, comprising locating, by the RNN processing module and based at least in part on a character embedding model and a word embedding model both of which the RNN processing module learned from second training data, a particular token of the plurality of tokens of the transaction record, wherein the particular token identifies the name of the service provider; and generating, by the information extraction system, a report specifying the name of the service provider in the transaction record.

10. The system of claim 9, wherein:
each service provider that is known to the information extraction system serves more transactions than each service provider that is not known to the information extraction system,
each token is a character sequence having an arbitrary length,
the first training data includes a plurality of first examples, wherein each first example includes a class number associated with a name, and
the second training data includes a plurality of second examples, wherein each second example includes character begin and end positions of one or more entities.

11. The system of claim 9, wherein determining the classification of the transaction record comprises:
transforming a representation of the transaction record through a series of convolutional layers and pooling layers, each layer being generated by sliding one or more kernels over an output of a previous convolutional layer; and
determining the classification of the transaction record based on a final pooling layer of the pooling layers by feeding an output of the transforming to a fully connected feed forward network.

12. The system of claim 9, wherein the first training data comprises a sample of transactions served by a subset of all service providers, the subset being selected from all service providers based on a ratio between a number of transactions served by the subset of service providers over a number of transactions served by all service providers.

13. The system of claim 9, wherein locating the particular token comprises:
scanning each token in the transaction record by a character-level model to generate a character-level output, wherein the scanning is based on character embedding instances corresponding to characters in the transaction record;
generating a respective initial representation of each token in the transaction record from the character-level output;
scanning the initial representations of each token in the transaction record by a token-level model to generate a token-level output, the scanning by the token-level model including a token-level forward scan and a token-level backward scan;
generating a respective final representation of each token in the transaction record from the token-level output;
classifying each token by feeding final representations of the tokens to a softmax layer that produces a respective probability vector for each token; and
determining that the particular token identifies the name of the service provider based on results of the classifying.

14. The system of claim 13, wherein the character-level model is a long short-term memory (LSTM) model, a many-to-one bidirectional LSTM (BI-LSTM) model, or a one-dimensional CNN model, and the token-level model is a many-to-many BI-LSTM model.

15. The system of claim 13, wherein:
the character-level model is a many-to-one bi-directional long short-term memory (BI-LSTM) model and the token-level model is a many-to-many BI-LSTM;
scanning each token in the transaction record by the character-level model comprises, for each token in the transaction record,
performing a character-level forward scan of the character embedding instances of the token to generate a forward character-level representation of the token, and
performing a character-level backward scan of the character embedding instances of the token to generate a backward character-level representation of the token; and
generating a respective initial representation of each token in the transaction record comprises, for each token in the transaction record, concatenating i) the forward character-level representation of the token, ii) the backward character-level representation of the token, and iii) a word embedding corresponding to the token.

16. The system of claim 9, wherein the particular token includes a misspelled or shortened name of the service provider.

17. A non-transitory computer-readable medium storing instructions that, when executed by one or more processors, cause the one or more processors to perform operations comprising:
receiving, by an information extraction system including one or more processors, a transaction record, the transaction record including a plurality of tokens, the transaction record describing a transaction served by a service provider;
determining, by a convolutional neural network (CNN) processing module of the information extraction system, a classification of the transaction record based on a collection of parameters that the CNN processing module learned from first training data, the determining comprising
determining whether the service provider is known to the information extraction system or not known to the information extraction system,
if determining that the service provider is known to the information extraction system, generating a class label identifying a name of the service provider, and
if determining that the service provider is not known to the information extraction system, generating a predetermined class label indicating that the service provider is not a known service provider, wherein the CNN processing module has been configured through training to generate the predetermined class label in response to processing a transaction record corresponding to a service provider that is not known to the information extraction system;

in response to determining that the service provider is not known to the information extraction system, as indicated by generating the generation of the predetermined class label by the CNN processing module, triggering a recurrent neural network (RNN) processing module of the information extraction system, comprising locating, by the RNN processing module and based at least in part on a character embedding model and a word embedding model both of which the RNN processing module learned from second training data, a particular token of the plurality of tokens of the transaction record, wherein the particular token identifies the name of the service provider; and generating, by the information extraction system, a report specifying the name of the service provider in the transaction record.

18. The non-transitory computer-readable medium of claim 17, wherein:

each service provider that is known to the information extraction system serves more transactions than each service provider that is not known to the information extraction system, each token is a character sequence having an arbitrary length, the first training data includes a plurality of first examples, wherein each first example includes a class number associated with a name, and the second training data includes a plurality of second examples, wherein each second example includes character begin and end positions of one or more entities.

19. The non-transitory computer-readable medium of claim 17, wherein determining the classification of the transaction record comprises:

transforming a representation of the transaction record through a series of convolutional layers and pooling layers, each layer being generated by sliding one or more kernels over an output of a previous convolutional layer; and determining the classification of the transaction record based on a final pooling layer of the pooling layers by feeding an output of the transforming to a fully connected feed forward network.

20. Non-transitory computer-readable medium of claim 17, wherein the particular token includes a misspelled or shortened name of the service provider.

* * * * *